United States Patent [19]
Nakajima

[11] Patent Number: 5,793,408
[45] Date of Patent: Aug. 11, 1998

[54] OPTICAL SCANNING APPARATUS WITH IMPROVED STRUCTURE FOR ADJUSTING FOCUS POSITION

[75] Inventor: Tomohiro Nakajima, Machida, Japan

[73] Assignee: Ricoh Company, Ltd., Tokyo, Japan

[21] Appl. No.: 551,805

[22] Filed: Nov. 7, 1995

[30] Foreign Application Priority Data

Nov. 9, 1994 [JP] Japan .................................. 6-274656

[51] Int. Cl.⁶ ............................................... B41J 2/47
[52] U.S. Cl. ........................................ 347/259; 347/134
[58] Field of Search ................................. 342/257, 256, 342/259, 260, 241, 242, 243, 134; 358/474, 480, 481

[56] References Cited

U.S. PATENT DOCUMENTS

| | | |
|---|---|---|
| 4,869,582 | 9/1989 | Nakajima et al. . |
| 5,018,806 | 5/1991 | Nakajima . |
| 5,019,837 | 5/1991 | Schwarz ............................ 347/257 |
| 5,063,409 | 11/1991 | Nakajima . |
| 5,543,829 | 8/1996 | Fisli ................................... 347/257 |
| 5,638,189 | 6/1997 | Yanagisawa ....................... 358/481 |

*Primary Examiner*—Mark J. Reinhart
*Attorney, Agent, or Firm*—Oblon, Spivak, McClelland, Maier & Neustadt, P.C.

[57] ABSTRACT

An optical scanning apparatus which includes a housing, an optical source which emits an optical beam, a deflector which deflects an optical beam from the optical source, a focusing lens which focuses the optical beam from the deflector, and plural mirrors which reflect the optical beam from the deflector. The plural mirrors include a first mirror which reflects the optical beam from the deflector, a third mirror which reflects the optical beam from the first mirror, and a second mirror which reflects the optical beam from the third mirror. The optical beam is focused upon a photoconductive element by the focusing lens through the plural mirrors on a scanning surface, and at least one of the first mirror and the third mirror is pivotally supported to be adjusted in a sub-scanning direction. Further, the second mirror is slidably supported to be adjusted in a direction normal to a reflecting surface of the second mirror. The arrangement provides an advantageous structure by which a focus position is easily adjusted.

7 Claims, 5 Drawing Sheets

OPTICAL SCANNING APPARATUS WITH IMPROVED STRUCTURE FOR ADJUSTING FOCUS POSITION

BACKGROUND OF THE INVENTION

1. Field of the Invention

The invention relates to an optical scanning apparatus which can be utilized, for example, in a laser printer, a digital copying machine, or a laser facsimile machine.

2. Discussion of the Background

An example of an optical scanning apparatus having an optical element holding apparatus is described in Japanese Laid Open Patent No. 5-297261, in which an optical beam emitted from an optical source is deflected in the main scanning direction by a deflector and is focused via a convergent lens, mirror, etc., on a scanning surface of a photoconductive member. A cylindrical mirror is pressed into contact with a projection of a chassis by a pressing portion of a holding member to fix the mirror in a predetermined position. However, in an optical scanning apparatus in which the optical beam is focused on the scanning surface of a photoconductive element through plural optical elements, errors of the optical elements or the mounting position of the optical elements causes a focus position to be shifted. Particularly when a high density image is recorded by a fine beam spot, errors in a focus position in the main scanning direction and in the sub-scanning direction, and the conjugate position error in the optical system causes more serious image defects. A mirror holding apparatus in which angle and position of mirrors are adjusted in order to solve this problem, is described in Japanese Laid Open Patent No. 4-182634. However, this adjustment structure is complicated, and thus problematic.

SUMMARY OF THE INVENTION

Accordingly, an object of the present invention is to provide an optical scanning apparatus having an advantageous structure for adjusting a focus position.

Another object of the present invention is to provide a scanning apparatus in which the focus position can be adjusted with a high degree of accuracy even when a high density image is recorded by a fine optical beam spot.

These and other objects and advantages are achieve by the present invention which provides an optical scanning apparatus including a housing, an optical source which emits an optical beam, a deflector which deflects an optical beam from the optical source, a focusing lens which focuses the optical beam from the deflector, and plural mirrors which reflect the optical beam from the deflector to the photoconductive element. The mirrors include a first mirror which reflects the optical beam from the deflector, a third mirror which reflects the optical beam from the first mirror, a second mirror which reflects the optical beam from the third mirror, and a photoconductive element upon which the optical beam is focused by the focusing lens through the plural mirrors on a scanning surface. At least one of the first mirror and the third mirror is pivotally supported to be adjusted in a sub-scanning direction, and the second mirror is slidably supported to be adjusted in a direction normal to a reflecting surface of the second mirror.

BRIEF DESCRIPTION OF THE DRAWINGS

In describing preferred embodiment of the present invention illustrated in the drawings, specified terminology is employed for the sake of clarity. However, the invention is not intended to be limited to the specific terminology so selected, and it is to be understood that each specific element includes all technical equivalents which operate in a similar purpose.

A more complete appreciation of the present invention and many of the attendant advantages thereof will be readily obtained as the same becomes better understood by reference to the following detailed description, particularly when considered in connection with the accompanying drawings, wherein.

DESCRIPTION OF THE PREFERRED EMBODIMENTS

Figure 1:
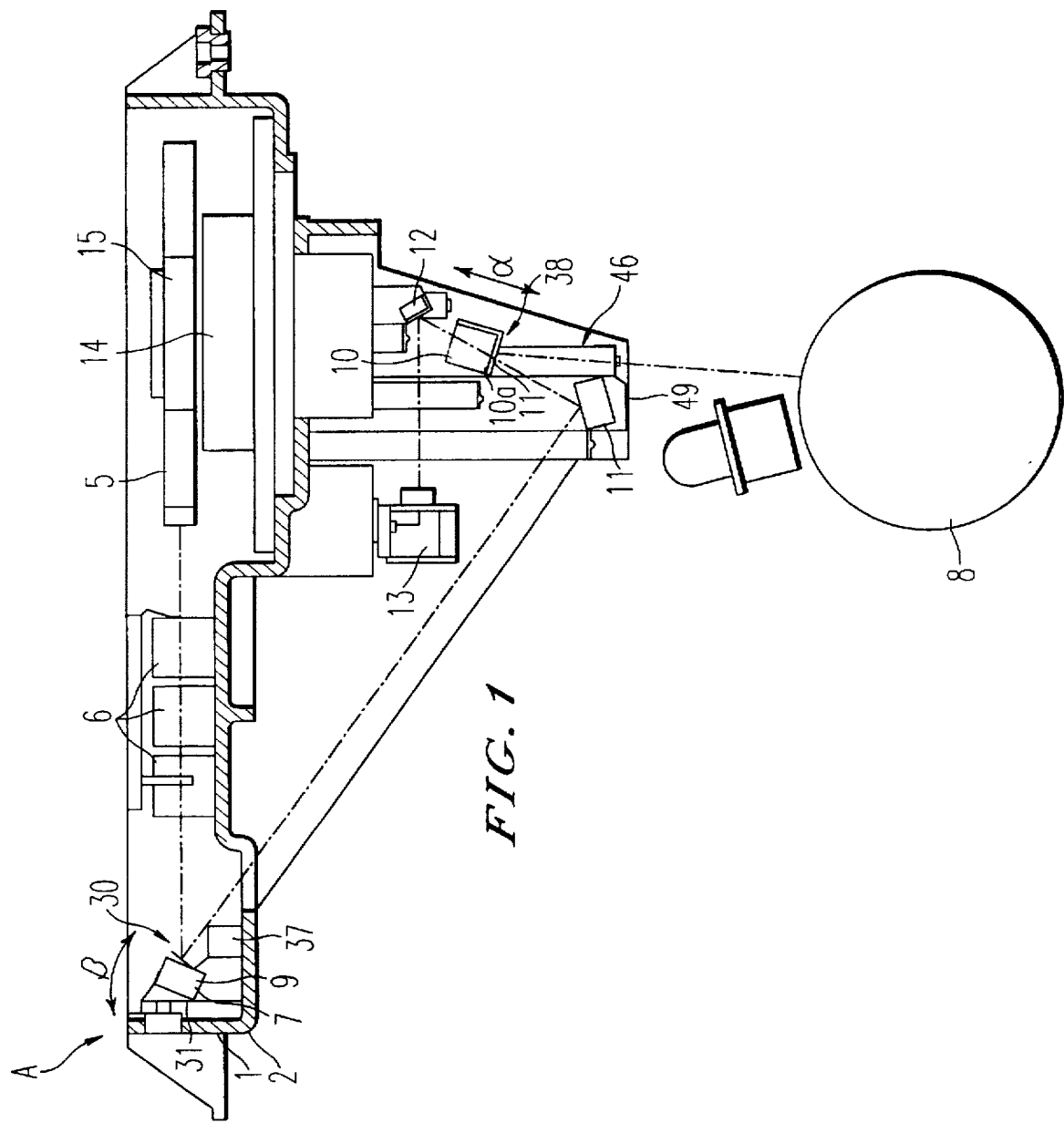
FIG. 1 is a sectional side view showing an optical scanning apparatus of an embodiment of the present invention.
Figure 2:
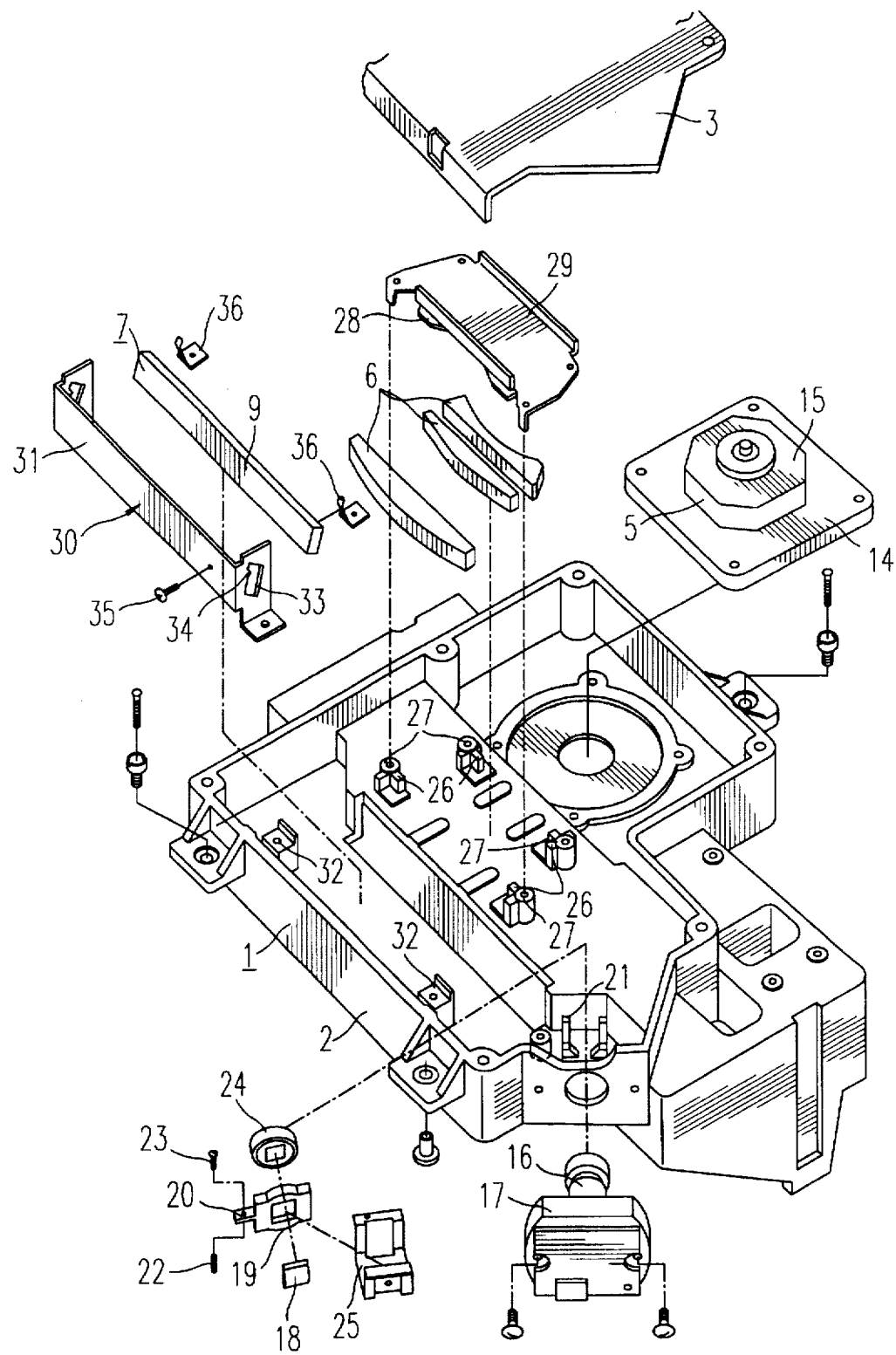
FIG. 2 is an exploded perspective view of the optical scanning apparatus in FIG. 1 as viewed from an upper side of a case.
Figure 3:
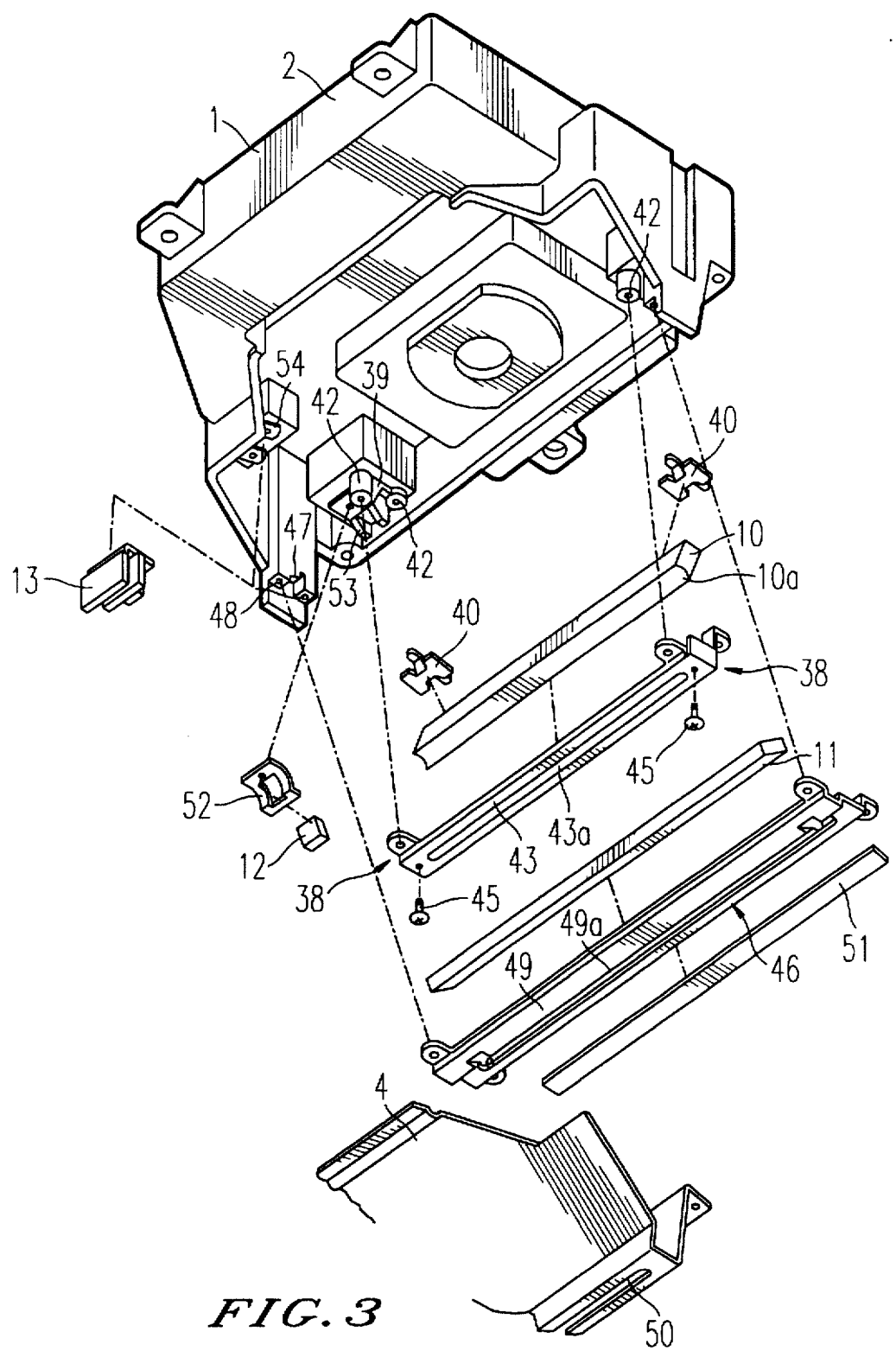
FIG. 3 is an exploded perspective view of the optical scanning apparatus in FIG. 1 as viewed from a lower side of a case.

Referring now to the drawings, preferred embodiments of the present invention will now be described. FIG. 1 is a sectional side view showing whole structure of an optical scanning apparatus A. As shown in FIGS. 1 and 2, a housing 1 includes a flat case 2, and an upper side cover 3 which seals an upper side of the case 2. A bottom surface cover 4 is installed upon a lower surface of the case 2 as shown in FIG. 3. In this optical scanning apparatus, an optical beam emitted from an optical source is deflected in the main direction by a deflector 5, and a focus position of the deflected beam is compensated by an fθ lens 6 as a focusing means. The compensated optical beam is optically focused on a scanning surface 8 of, e.g., a photoconductive element by a reflecting assembly 7 such that an image is formed on the scanning surface 8. The reflecting assembly 7 includes a first mirror 9, which is pivotally supported in the sub-scanning direction β (i.e., so that the mirror 9 moves in a sub-scanning direction which is perpendicular to the scanning direction of the beam upon scanning surface 8) a second mirror 10, which includes a reflecting mirror reflecting the optical beam to the scanning surface 8 and which is slidably supported in the direction a normal to reflecting surface 10a; and a third mirror 11, which reflects the optical beam from the first mirror 9 to the second mirror 10 and which is also pivotally supported in the sub-scanning direction β.

Further, a detection reflecting mirror 12 reflects the optical beam reflected from the third mirror 11, and is mounted outside an edge of the second mirror 10. A detector is mounted to detect the optical beam reflected from the detection reflecting mirror 12, and generates a synchronized signal. The deflector 13 includes a polygon motor 14, which is mounted on the case, and a polygon mirror 15, which is mounted to the polygon motor.

FIG. 2 is an exploded perspective view of the optical scanning apparatus as viewed from the upper side of the case 2. The case 2 is provided with an optical source unit 16. The optical source unit 16 includes a semiconductor laser and a collimator lens (not shown in the figure) which are fixed to a casing 17 installed on the case 2. A cylindrical lens 18, by which the optical beam emitted from the optical source unit 16 is focused on a reflecting surface of the polygon mirror 15, is fixed to the case 2 by a supporting member 19. In addition, a projection 20 extends in a horizontal direction of the supporting member 19, and an adjusting screw 23 extends through the projection 20 and a spring 22 to engage with the case 2. The supporting member 19 is rotatably adjustable with mount 25 by the screw 23. One portion of an outer peripheral surface of the supporting member 19 is supported on a supporting surface 21 having a V shaped structure 40 to thereby fix the cylindrical lens 18 at an optical axis center location. An aperture 24 is supported by a supporting member 25, and thereby, it also is fixed at the center of the optical axis.

Positioning portions 26 for positioning the fθ lens 6 and plural bosses 27 are formed in the center of the case 2. In addition, a supporting member 29, which is provided with leaf springs 28, is installed to the bosses 27 and the fθ lens 6 is pressed and positioned by the leaf springs 28.

Figure 4:
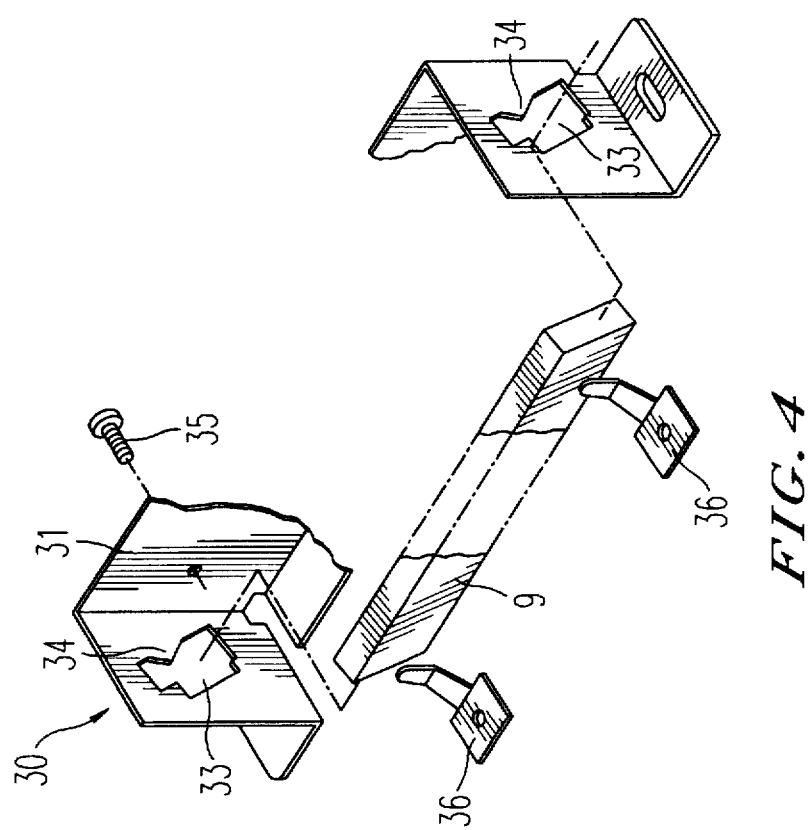
FIG. 4 is an exploded perspective view showing a structure for supporting a first mirror in the optical scanning apparatus of FIG. 1.

Next, referring to FIGS. 2 and 4, a structure of a supporting member 30 for the first mirror 9 will be described. Numeral 31 represents a supporting member which is fixed to fixing portions 32 formed in the case 2. The first mirror 9 is inserted into square holes 33 formed in both edges of the supporting member 30, and a triangular support 34, which supports a back surface of the first mirror 9, is formed on one side of each square hole. An adjusting screw 35 supports the first mirror 9 at a position apart from a straight line between those supports 34 and is engaged with a back side of the supporting member 31. In addition, a pair of leaf springs 36 press both edge portions of the first mirror 9 toward the supports 34 and the adjustment screw 35, and are engaged with a back side of the supporting member 31. In addition, a pair of leaf springs 36 press both edge portions of the first mirror 9 to the supports 34 and the adjustment screw 35, and are fixed to bosses 32 formed in the case 2 as shown in FIG. 1. The adjusting screw 35 is turned to adjust the first mirror 9 as it pivots about the straight line between the supports 34. The direction of adjustment is in the sub-scanning direction β as shown in FIG. 1.

Figure 5:
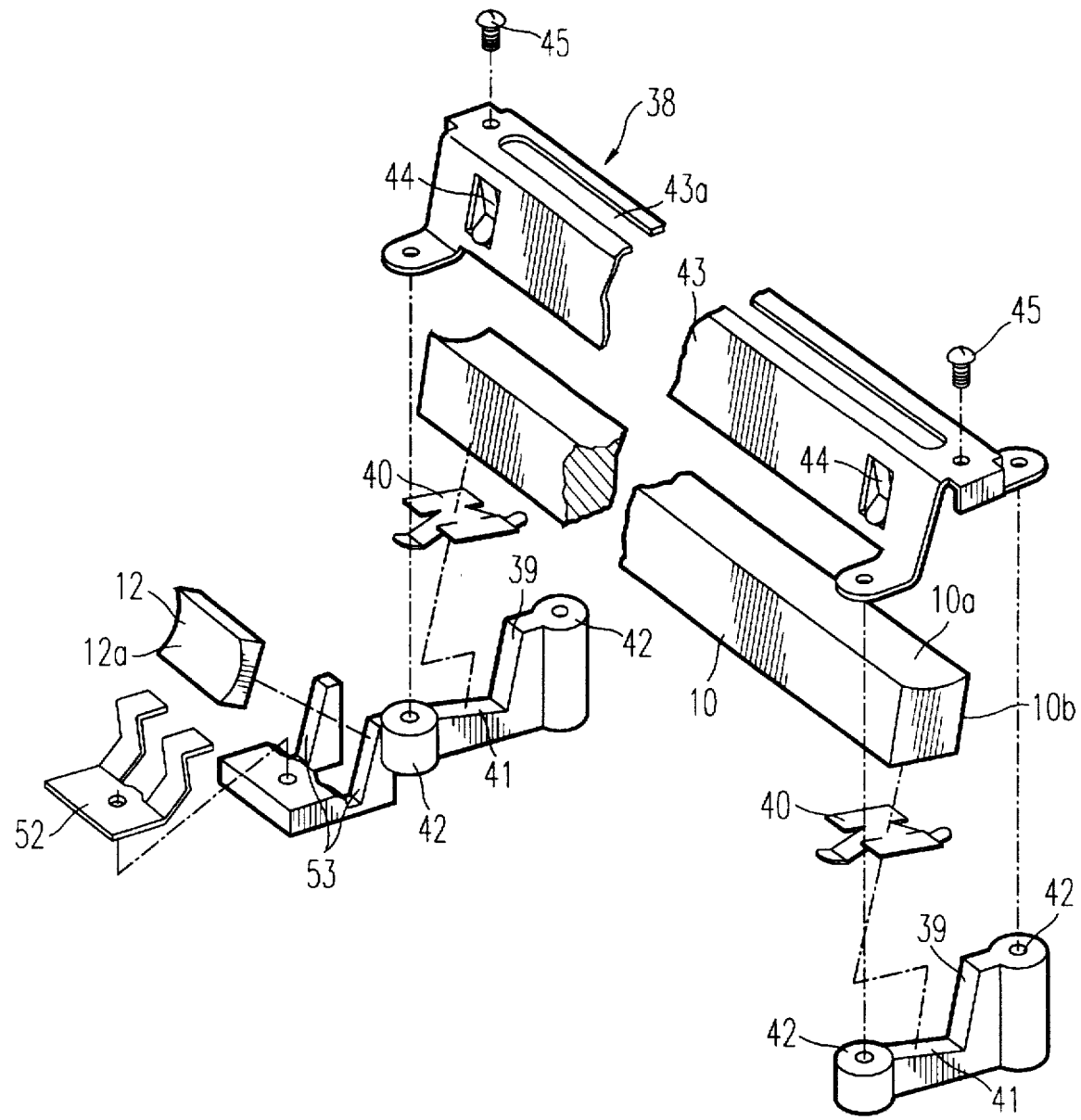
FIG. 5 is an exploded perspective view showing a structure for supporting a second mirror, and a detection reflecting mirror (for a detector) in the optical scanning apparatus of FIG. 1.

Next, referring to FIGS. 1, 3 and 5, a structure of a supporting arrangement of the second mirror 10 will be described. FIG. 3 is an exploded perspective view, as viewed from the lower side of the case 2. FIG. 5 is an exploded perspective view showing a structure of supporting means 38 from the same view point. The second mirror 10 is a cylindrical mirror, with a reflecting surface 10a having a curvature in the sub-scanning direction. At both sides of the lower surface of the case 2, are provided: guiding surfaces 39, which slidably support side surfaces 10b of the second mirror 10 in a direction a normal to the reflecting surface 10a as shown in FIG. 1; supporting surfaces 41 at right angles to the guiding surface 39, and which supports leaf springs 40 of an elastic member; and plural bosses 42. As shown, these elements can be integrally formed or formed as a single piece at each end of the case. A supporting member 43 is mounted to the bosses 42. At both sides of the supporting member 43, pressing portions 44 are provided to press the side surfaces 10b of the second mirror 10 to the guiding surface and adjusting screws 45 are provided such that the arrangement presses the second mirror 10 against an elastic force of the leaf springs. A rectangular hole 43a is provided for passage of the optical beam.

In the supporting member 38, the pressing portions 44 of the supporting member 43 press the side surface 10b of the second mirror 10, and thereby the position of the second mirror is determined in the direction perpendicular to the normal line α. In addition, turning of either or both of the adjusting screws 45 (which support the second mirror 10 against the elastic force of the leaf springs 40) determines the position of the second mirror 10 along the normal line direction α.

Referring to FIG. 3, a supporting structure 46 of the third mirror 11 will now be described. At both sides of the lower side of the case 2 are formed supporting surfaces 47 which support both edges of the third mirror 11, and plural bosses 48 are located near the supporting surface 47, e.g., in a unitary structure. A supporting member 49, which presses the third mirror 11 to the supporting surface 47, is mounted to the bosses 48. The supporting member 49 includes a rectangular hole 49a to provide a passage for the optical beam. In addition, a rectangular opening 50 provides a passage for the optical beam, while a dustproofing glass seals the opening 50 in the bottom cover 4.

In the above embodiment, the first mirror is pivotable while the third one is fixed. However, it is also possible to provide the third mirror as pivotable, while the first one is fixed. It is also possible to provide both of the first and the third mirror as pivotable mirrors.

As shown in FIGS. 3 and 5, the detection reflecting mirror 12 is a cylindrical mirror having a reflecting surface 12a with a curvature in the sub-scanning direction. The detection reflecting mirror 12 is pressed and fixed by a supporting surface which is formed in one side of the lower surface of the case 1. As shown in FIG. 3, a mounting portion 54, which mounts the detector 13 (which detector provides a synchronized signal), is formed in one side of the lower surface of the case 1.

With the above structure, the optical beam from the optical source 16 is deflected on the rotating polygon mirror 15, and its focus position is compensated by the fθ lens. The beam is then returned by the first mirror 9 and the third mirror 11, and is also reflected by the second mirror 10. The beam is then focused on the scanning surface 8.

The foregoing embodiments can be advantageous in a number of respects as will now be described.

According to the present invention, either or both of the first and the third mirrors are pivotably adjusted in the sub-scanning direction β, and the second mirror is slidably adjusted in the direction a normal to reflecting surface 10a, such that the focus position of the optical beam can be easily adjusted on the scanning surface.

In addition, the cylindrical mirror, which has a curvature in the sub-scanning direction, is employed as the second mirror 10, such that the focus position in the sub-scanning direction can correspond to the focus position in the main scanning direction. As a result, the present structure is particularly advantageous when a high density image is recorded by a fine optical beam spot. While in the depicted embodiment the cylindrical mirror has a curvature in the sub-scanning direction, the cylindrical mirror could also have a curvature in the sub-scanning direction and in the main scanning direction.

In accordance with a further advantageous aspect, both edges of the second mirror 10 can be adjusted independently, such that alignment or parallelization of the second mirror 10 can be adjusted relative to the scanning surface 8. Accordingly, the focus position of the optical beam can be adjusted on the scanning surface easily and accurately.

Further, since the side surfaces 10a of the second mirror 10 are pressed against the guiding surface 39 by the pressing portions 44 of the supporting member 43, the position of the second mirror 10 can be determined in the direction perpendicular to the normal line direction α. Moreover, the adjusting screws 45 are turned to adjust the position of the second mirror 10 in the normal line direction α, such that the focus position of the optical beam can be adjusted on the scanning surface easily and accurately. In this case, separate supporting members at the both edges can be employed as an alternative to the supporting member 43.

In accordance with another aspect, the detection reflecting mirror 12 is mounted outside the edge of the second mirror 10, such that even if the second mirror is adjusted in the normal line direction α, a shift of the optical beam for the synchronized signal can be prevented.

In addition, the detection reflecting mirror 12 has a predetermined curvature in the sub-scanning direction, and thereby the focus position in the main scanning direction corresponds to the surface of the detector, while the focus position in the sub-scanning direction shifts from the surface of the detector 13, which provides a synchronized signal. As a result, an optical density on the surface of the detector can be diffused, whereby a response of the detector for synchronized signal 13 can be improved. Moreover, even if the optical beam is shifted in the sub-scanning direction, it is difficult to shift the optical beam from a detecting surface of the detector 13 which provides the synchronized signal. Therefore the detector 13 and the reflecting mirror 12 for the detector 13 can be easily positioned.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An optical scanning apparatus comprising:
    (a) a housing;
    (b) an optical source which emits an optical beam;
    (c) a deflector which deflects an optical beam from the optical source;
    (d) a focusing lens which focuses the optical beam from the deflector;
    (e) plural mirrors which reflect the optical beam from the deflector, said plural mirrors comprising:
        (i) a first mirror which reflects the optical beam passing through the focusing lens from the deflector;
        (ii) a third mirror which reflects the optical beam from the first mirror; and
        (iii) a second mirror which reflects the optical beam from the third mirror; and
    (f) a photoconductive element upon which the optical beam is scanned in a scanning direction and upon which the optical beam is focused by the focusing lens through the plural mirrors on a scanning surface thereof;

wherein at least one of the first mirror and the third mirror is pivotally supported for adjustment such that said mirror moves in a sub-scanning direction perpendicular to the scanning direction and the second mirror is slidably supported to be adjusted in a direction normal to a reflecting surface of the second mirror.

2. The optical scanning apparatus of claim 1, wherein the second mirror comprises a cylindrical mirror which has a curvature.

3. The optical scanning apparatus of claim 1, including means for independently adjusting each edge of the second mirror.

4. The optical scanning apparatus of claim 3, wherein the second mirror is supported on the housing by a supporting member comprising guiding surfaces which slidably support side surfaces of the second mirror in said normal direction, elastic members which press the second mirror in the normal direction, and screws which adjustably press the second mirror against a force of the elastic members.

5. The optical scanning apparatus of claim 4, wherein the supporting member comprises two separate parts, and each supporting member comprises a guiding surface which slidably supports the side surface of the second mirror in said normal direction, an elastic member which presses the second mirror in the normal direction, and a screw which presses the second mirror against a bias force of the elastic members.

6. The optical scanning apparatus of claim 1, wherein a detection reflecting mirror is mounted outside an edge of the second mirror and reflects the optical beam from the third mirror to a detector which provides a synchronized signal.

7. The optical scanning apparatus of claim 6, wherein the detection reflecting mirror has a curvature such that a focus position in a main scanning direction corresponds to the surface of the photoconductive member such that a focus position in a sub-scanning direction shifts from the surface thereof.

* * * * *